United States Patent [19]
Seconi et al.

[11] Patent Number: 5,619,726
[45] Date of Patent: Apr. 8, 1997

[54] APPARATUS AND METHOD FOR PERFORMING ARBITRATION AND DATA TRANSFER OVER MULTIPLE BUSES

[75] Inventors: Mark Seconi, Phoenix; Paul Mc Allister, Chandler, both of Ariz.; Andrew Hall, Hillsboro, Oreg.; Marc Jalfon, Haifa, Israel

[73] Assignee: Intel Corporation, Santa Clara, Calif.

[21] Appl. No.: 320,927

[22] Filed: Oct. 11, 1994

[51] Int. Cl.⁶ .......................... G06F 13/28; G06F 13/36
[52] U.S. Cl. .................. 395/842; 395/287; 395/293; 395/308
[58] Field of Search .................. 395/842, 860, 395/287, 293, 729, 308, 861; 340/825.5

[56] References Cited

U.S. PATENT DOCUMENTS

| | | | |
|---|---|---|---|
| 4,455,620 | 6/1984 | Watanabe et al. | 395/847 |
| 4,648,029 | 3/1987 | Cooper et al. | 395/293 |
| 4,821,170 | 4/1989 | Bermick et al. | 395/856 |
| 4,878,166 | 10/1989 | Johnson et al. | 395/307 |
| 5,072,365 | 12/1991 | Burgess et al. | 395/737 |
| 5,212,795 | 5/1993 | Hendry | 395/848 |
| 5,214,775 | 5/1993 | Yabushita et al. | 395/444 |
| 5,345,566 | 9/1994 | Tanji et al. | 395/308 |
| 5,377,331 | 12/1994 | Drerup et al. | 395/293 |
| 5,414,820 | 5/1995 | McFarland et al. | 395/308 |
| 5,438,666 | 8/1995 | Craft et al. | 395/842 |
| 5,450,551 | 9/1995 | Amini et al. | 395/299 |
| 5,463,740 | 10/1995 | Taniai et al. | 395/299 |
| 5,499,384 | 3/1996 | Lentz et al. | 395/821 |
| 5,535,395 | 7/1996 | Tipley et al. | 395/729 |

*Primary Examiner*—Gopal C. Ray
*Attorney, Agent, or Firm*—Blakely, Sokoloff, Taylor & Zafman

[57] ABSTRACT

An apparatus and method for arbitrating bus ownership of a first communication bus ("C1-bus") for a plurality of C1-bus masters and arbitrating bus ownership of a second communication bus ("C2-bus") for a plurality of C2-bus masters. The apparatus further performs a DMA transfer, without processor assistance, between a first component coupled to the C1-bus and a second component coupled to the C2-bus.

27 Claims, 8 Drawing Sheets

APPARATUS AND METHOD FOR PERFORMING ARBITRATION AND DATA TRANSFER OVER MULTIPLE BUSES

BACKGROUND OF THE INVENTION

1. Field of the Invention

The present invention relates to the field of data transfer. More particularly, the present invention relates to an apparatus and method for arbitrating bus ownership of a plurality of communications buses and for efficiently performing data transfers, without processor assistance, between a first component coupled to one communication bus and a second component coupled to another communication bus.

2. Background Art Relating to the Present Invention

It is commonly known that a computer system comprises a number of electronic components which transfer data in order to accomplish a specific task. One well-known method of data transfer is direct memory access ("DMA transfer") which is usually performed by a DMA element. As shown in FIG. 1, a conventional computer system 10 supporting DMA transfers comprises a DMA element 20, main memory element 40 and a plurality of bus masters coupled together through a single communication bus 30 (e.g., a system bus). A "bus master" is an element, component or device which can initiate sequences through a communication bus to perform various operations. In FIG. 1, for example, a host processor 50 and a peripheral device 60 having internal memory 70 are bus masters.

The host processor 50 initiates a DMA transfer, for example a DMA transfer between the main memory element 40 and the internal memory 70 of the peripheral device 60, by transmitting certain information to the DMA element 20 through the communication bus 30. Such information may include the amount of data to be transferred, the starting address of the memory block storing the data, the type of data transfer and the like. The DMA element 20 starts and continues to transfer data between a main memory element 40 and the internal memory 70 until the DMA transfer is completed.

Recently, it is becoming desirous to employ multiple processors within a computer system in order to enhance its overall processing speed. Generally, these multi-processor computer systems comprise a host processor coupled to a first communication bus and any number of auxiliary processors coupled to a second communication bus. While multi-processor computer systems may provide greater processing speed, they afford a number of disadvantages. One such disadvantage is that in a multi-processor computer system, conventional DMA elements can not support DMA transfers between elements coupled to different communication buses. Additionally, initiating data transfers is restricted to only the host processor with no initiating transfer provisions available to the auxiliary processors residing on the second communication bus.

Besides these above-identified disadvantages, a number of performance disadvantages are also inherent with conventional DMA elements. One primary disadvantage is that conventional DMA elements perform DMA transfers through two sequential memory sequences (i.e., a memory read sequence followed by a memory write sequence). Thus, the time required to complete this DMA transfer is substantially greater than the DMA transfer performed through concurrent memory sequences.

A second disadvantage is that conventional DMA elements may not be interrupted or temporarily halted until the DMA transfer is complete. This prevents any processor from accessing the communication buses during a DMA transfer. For multi-processor computer systems executing real-time applications, this inability to interrupt or temporarily halt the DMA transfer may accidentally cause an application to "time-out" (e.g., a modem application terminating its connection) and at least precludes the computer system from achieving its optimal processing speed.

Another disadvantage is related to software overhead required by the host processor to service auxiliary processor interrupts signaling the need for data which would be delivered via a DMA transfer initiated by the host processor. Software overhead is a processor executed control operation requiring the host processor to (i) save to memory its current state before initiating the DMA transfer and (ii) restore this saved state after the data transfer has completed so that the processor may continue its pre-data transfer operations. As a result, the DMA transfer tends to be inefficient if the time required to perform the software overhead is relatively large compared to the time actually required by the DMA transfers.

Hence, it would be desirable too employ an apparatus that overcomes one or more of the cited disadvantages.

Another object of the present invention is to provide an apparatus and method for which simulates the operations of the host processor so that DMA transfers performed by the apparatus are transparent to other components coupled to the first communication bus to facilitate normal operations by the computer system under a DMA transfer.

Another object of the present invention is to provide an apparatus and method for enabling the host processor to access the second communication bus as a bus master.

A further object of the present invention is to provide an apparatus and method for interrupting or temporary halting DMA transfers by any processor in order to allow time critical execution of real-time applications without having to wait for a transfer to complete.

Yet another object of the present invention is to provide an apparatus and method for enabling processors on the second communication bus, in addition to the host processor, to initiate DMA transfers.

BRIEF SUMMARY OF THE INVENTION

The present invention relates to an apparatus and method for (i) arbitrating bus ownership of a first communication bus ("C1-bus") for a plurality of C1-bus masters, (ii) arbitrating bus ownership of a second communication bus ("C2-bus") for a plurality of C2-bus masters and (iii) performing a DMA transfer, without processor assistance, between a first component coupled to the C1-bus and a second component coupled to the C2-bus. The apparatus comprises C2-bus control registers, a C2-bus arbitration element, a C1-bus arbitration element, microcontroller C2-bus master logic, a DMA transfer state machine, DMA control registers and DMA interrupt/C2-bus locking logic.

With respect to the arbitration functionality, the C1-bus arbitration element and the C2-bus arbitration element are used to arbitrate which C1-bus master and C2-bus masters obtain bus ownership. The plurality of C2-bus masters request access to the C2-bus by inputting a C2-bus request ("C2REQ") signal into the C2-bus arbitration element. The microcontroller C2-bus master logic enables either a microcontroller coupled to the C1-bus to request access to the C2-bus, or alternatively the apparatus to request access to the C2-bus for a DMA transfer. Based on the programmable access priorities and status information stored in the C2-bus control registers and whether the DMA interrupt/C2-bus locking logic is "locking" a particular processor requesting the DMA transfer to the C2-bus (i.e. temporarily making that processor the highest priority C2-bus master), the C2-bus arbitration element generates a C2-bus grant ("C2GNT") to the highest priority C2-bus master requesting the C2-bus. The C2GNT signal, in response to the C2REQ signal generated by the microcontroller C2-bus master logic on behalf of the apparatus, is transmitted to the DMA transfer state machine. In addition, the C1-bus arbitration element arbitrates which C1-bus master receives access to the C1-bus. If the apparatus receives C1-bus ownership, the C1-bus arbitration element transmits a control signal indicating the same to the apparatus.

With respect to the DMA transfer functionality, the DMA transfer state machine states drive various control signals on the C1-bus and the C2-bus to enable a DMA transfer to occur upon gaining access to these C-buses. The DMA control registers support DMA transfers by providing information to logic generating DMA interrupts, locking the processor requesting a DMA transfer to the C2-bus during a DMA transfer setup and storing performance parameters of the DMA transfer.

The method associated with performing DMA transfers is discussed below in detail. The apparatus transitions from state to state to perform various operations. Such transition is based largely on whether the apparatus has access to both the C1-bus and C2-bus.

BRIEF DESCRIPTION OF THE DRAWINGS

The features and advantages of the present invention will become apparent from the following detailed description of the present invention in which.

DETAILED DESCRIPTION OF THE INVENTION

The present invention relates to an Arbiter/DMA element which arbitrates ownership of a plurality of communication buses and directly performs DMA transfers between memory elements coupled to different communication buses. In the following description, numerous specific details are set forth, such as specific components of the Arbiter/DMA element, register configurations and the like. It is apparent, however, to one skilled in the art that these specific details are not required to practice the present invention. Moreover, in other instances, well-known devices, various control signals and the like are not discussed in detail in order to avoid obscuring the present invention.

In this description, a number of terms are frequently used to describe certain well-known circuits and signal representations. A "state machine" is a combination of conventional logic gates, typically synchronous in nature, which receives as input at least one control input containing state information and responds to the control input through at least one control output. A "memory sequence" is defined as a number of bus cycles (e.g., events necessary to perform a given operation) required to perform a memory read or memory write. The term "de-assert" and all tenses associated therewith indicate that the signal exists at a logic level "0" state or a logic level "1" state for active-low signals. Conversely, the term "asserted" and all tenses associated therewith are used to indicate a logic level "1" or a logic level "0" for active-low signals.

Figure 1:
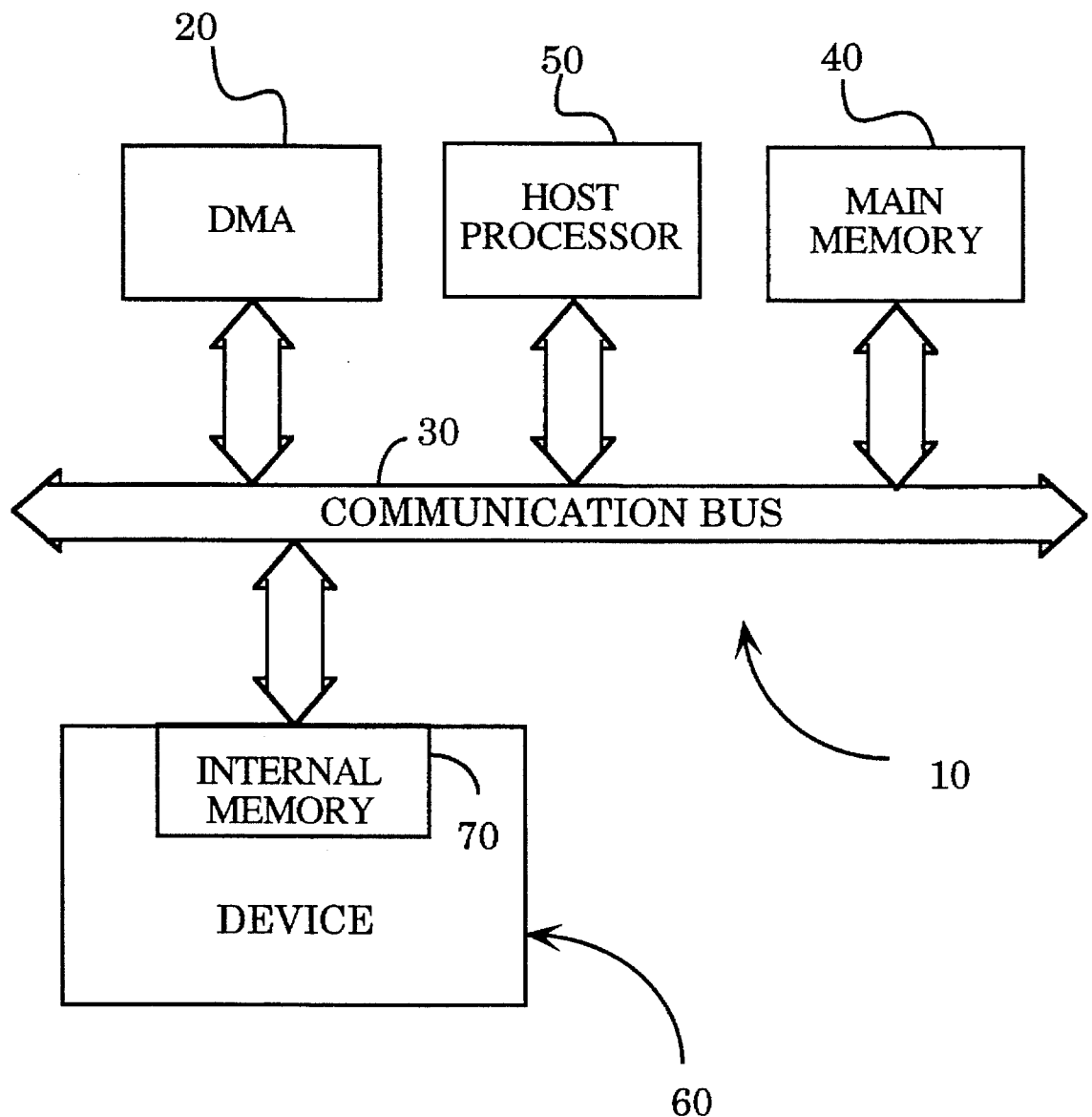
FIG. 1 is a block diagram illustrating a conventional computer system comprising a DMA element to support DMA transfers between devices coupled to a common communication bus.
Figure 2:
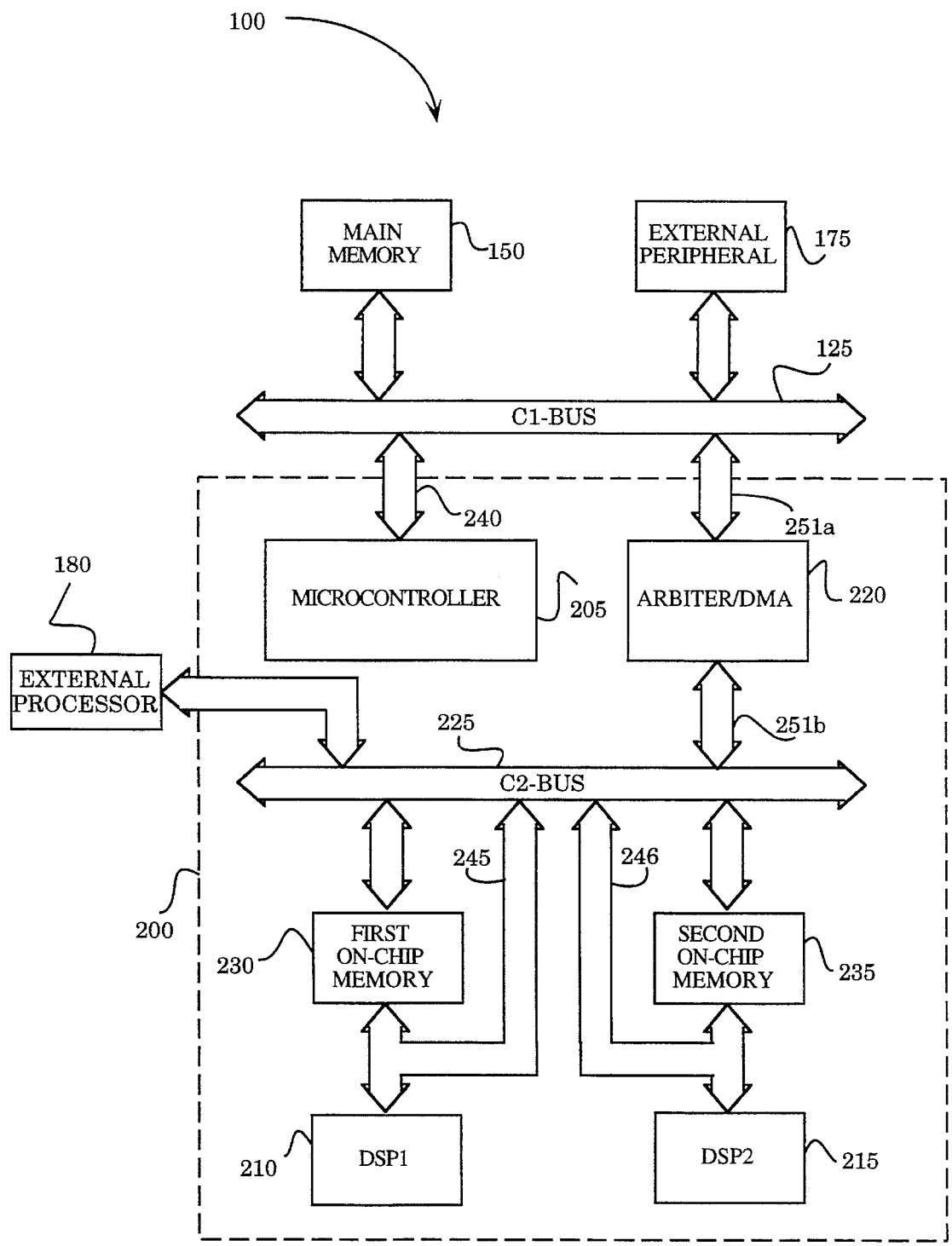
FIG. 2 is a block diagram illustrating a multi-processor computer system employing an Arbiter/DMA element which arbitrates ownership of both a first communication bus and a second communication bus and performs DMA transfers between a first memory element coupled to the first communication bus and a second memory element coupled to the second communication bus.

Referring to FIG. 2, an illustrative embodiment of a computer system employing the present invention is shown. The computer system 100 comprises a first communication bus ("C1-bus") 125 coupling together a plurality of bus agents such as an external main memory element 150, an external peripheral device (e.g., a PCMCIA unit) 175 and a communications processor 200. The computer system 100 also comprises an external processor (e.g., a digital signal processor) 180 coupled to a second communications bus ("C2-bus") 225 internal to the communications processor 200. In the alternative, however, it is contemplated that the computer system 100 may not employ the external processor 180 nor the external peripheral device 175.

In this embodiment, the communications processor 200 comprises a plurality of processors; namely, a microcontroller 205 operating as a host processor and at least a pair of digital signal processors referred to herein collectively as "DSPs" or separately as a first DSP ("DSP1") 210 and a second DSP ("DSP2") 215. The communications processor 200 further comprises an Arbiter/DMA element 220 coupled between the C1-bus 125 and the C2-bus 225 (collectively referred to as "C-buses"), a first on-chip memory element 230 being coupled between the DSP1 210 and the C2-bus 225 and a second on-chip memory element 235 being coupled between the DSP2 215 and the C2-bus 225. The microcontroller 205 (or alternatively the Arbiter/DMA element 220 for DMA transfers) and the external peripheral device 175 may operate as bus masters of the C1-bus 125 ("C1-bus masters"). Moreover, the external processor 180, both DSPs 210 and 215 as well as the microcontroller 205 (or alternatively the Arbiter/DMA element 220 for DMA transfers) may operate as a bus master of the C2-bus ("C2-bus masters"). The microcontroller 205 and Arbiter/DMA element 220 share the same logic used to initiate requests for ownership to (e.g., access of) the C2-bus 225.

The microcontroller 205 is coupled to the C1-bus 125 through bi-directional data lines 240 in order to retrieve information being stored in the main memory element 150 or propagating through the C1-bus 125. Furthermore, each of the DSPs 210 and 215 bi-directionally communicates with its corresponding on-chip memory elements 230 and 235 through bi-directional data lines 245 and 246, respectively. The on-chip memory elements 230 and 235 include designated storage addresses for both executable program instructions and data. These DSPs 210 and 215 also are coupled directly to the C2-bus 225 in order to establish bi-directional communications with any on-chip memory elements coupled thereto. For example, the DSP1 210 may directly access information from the first on-chip memory element 230 as well as access information from the second on-chip memory element 235.

Since the on-chip memory elements 230 and 235 generally have limited storage capacity, these on-chip memory elements 230 and 235 should be updated frequently with new information to avoid the DSPs 210 and 215 from experiencing unwanted time delays in awaiting information. The Arbiter/DMA element 220 enables these on-chip memory elements 230 and 235 to be frequently updated in an efficient manner.

The Arbiter/DMA element 220 bi-directionally communicates with the C1-bus 125 and the C2-bus 225 through a first and second information buses 251a and 251b in order to arbitrate ownership of these C-buses and to perform DMA transfers between the main memory element 150 and one of the on-chip memory elements 230 or 235 without processor assistance. The Arbiter/DMA element 220 arbitrates ownership of the C1-bus 125 under a Hold/Hold Acknowledge communication scheme, although any conventional communication scheme may be used. This Hold/Hold Acknowledge communication scheme is employed because the temporary suspension of the microcontroller 205, the most common C1-bus master, effectively provides sufficient regulation of the C1-bus 125 by another C1-bus master. The Arbiter/DMA element 220 further arbitrates ownership of the C2-bus 225 between the C2-bus masters under a Request/Grant communication scheme, operating independently from the C1-bus arbitration.

With respect to the performance of DMA transfers, the Arbiter/DMA element 220 employs a DMA transfer state machine which interacts with other state machines involved in the arbitration of the C-buses to perform DMA transfers. A request for a DMA transfer is detected when one of the processors 205, 210 or 215 writes to the Arbiter/DMA element 220, namely its control registers, to request a "DMA Idle" interrupt. If no other DMA transfers are currently in progress, the Arbiter/DMA element 220 immediately generates a "DMA Idle" interrupt and automatically "locks" the processor to the C2-bus 225 so that it may set up the DMA transfer without being interrupted by other processors.

After the processor has appropriately input requisite parameters of the DMA transfer into the Arbiter/DMA element 220, the Arbiter/DMA element 220 unlocks the processor from the C2-bus 225 and performs the DMA transfer. When the transfer is complete, the Arbiter/DMA element 220 automatically generates a "DMA Complete" interrupt to the processor that initiated the DMA transfer. If, at the end of the transfer, a request for a DMA Idle interrupt is pending by another processor, the above-described process repeats.

Figure 3:
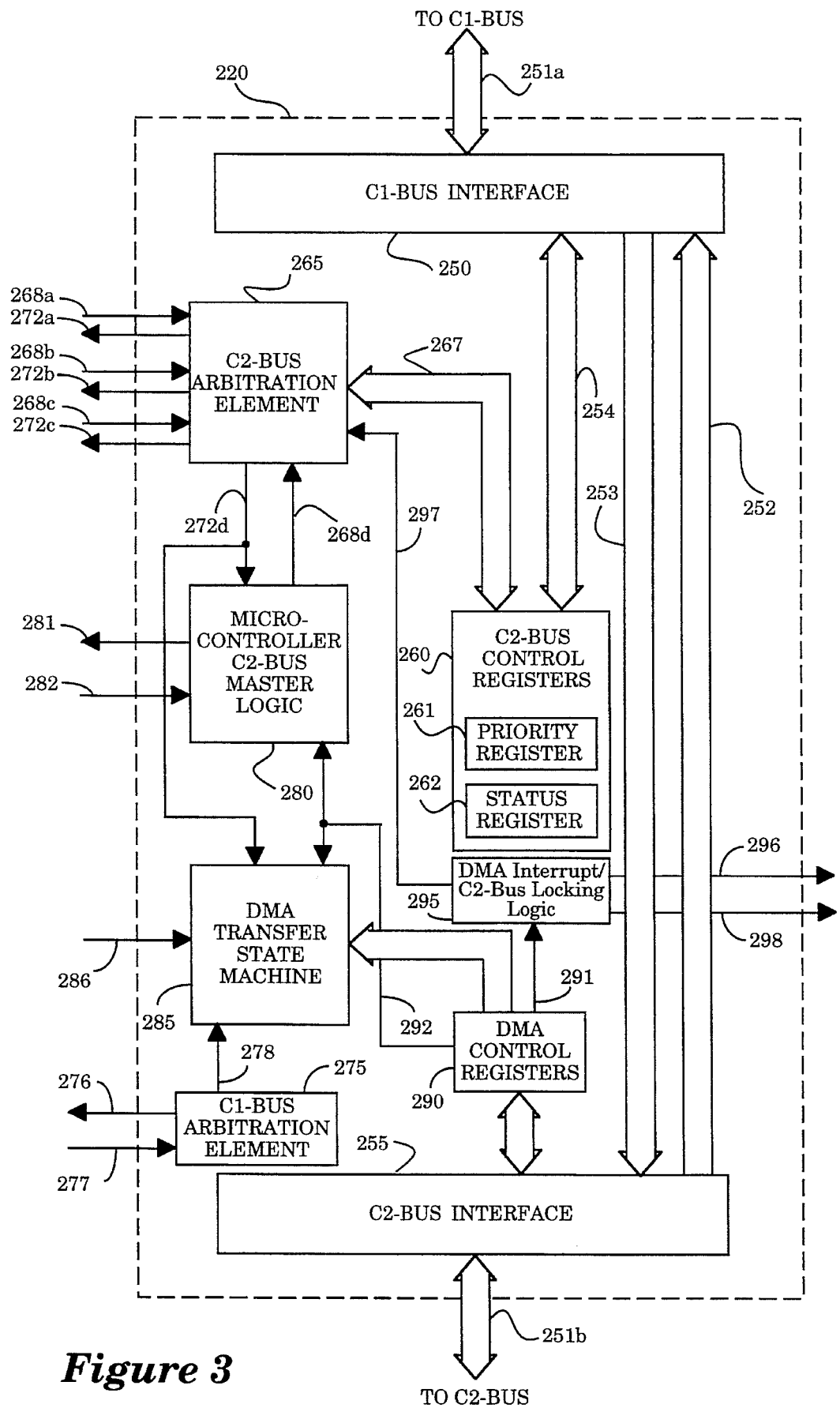
FIG. 3 is a block diagram of the Arbiter/DMA element comprising C2-bus control registers, a C2-bus arbitration element, a C1-bus arbitration element, microcontroller C2-bus master logic, a DMA transfer state machine, DMA control registers and DMA interrupt/C2-bus locking logic, all of which being coupled between C1-bus and C2-bus interfaces establishing a connection between the C1-bus and C2-bus, respectively.

Referring to FIG. 3, an illustrative embodiment of the Arbiter/DMA element is shown. The Arbiter/DMA element 220 comprises a C1-bus interface 250, a C2-bus interface 255, C2-bus control registers 260, a C2-bus arbitration element 265, a C1-bus arbitration element 275, microcontroller C2-bus master logic 280, a DMA transfer state machine 285, DMA control registers 290 and DMA interrupt/C2-bus locking logic 295. The C1-bus interface 250 enables the Arbiter/DMA element 220 to bi-directionally communicate with the C1-bus through a first bi-directional information bus 251a in order to receive information from and transfer information to the C1-bus according to its particular format and data/phase timing relationship. The C1-bus interface 250 further enables communication with the C2-bus interface 255 through a pair of uni-directional "n" bit-wide address/data buses 252 and 253, where "n" is an arbitrary number preferably equal to "31". These address/data buses 252 and 253 allow data to be transferred between devices coupled to C1-bus and C2-bus, respectively. Additionally, the C1-bus interface 250 is coupled to the C2-bus control registers 260 through a bi-directional "m" bit wide data bus 254, "m" preferably being 16-bits. This data bus 254 provides an ability to program relative access priority of each C2-bus master via the C1-bus.

The Arbiter/DMA element 220 controls the arbitration of the C2-bus based on the access priorities and general status information stored in these C2-bus control registers 260. The C2-bus control registers 260 include a priority register 261 providing access priorities of various C2-bus masters and a status register 262 providing various C2-bus status information (e.g., which C2-bus master is currently controlling the C2-bus, which C2-bus master is requesting ownership of the C2-bus, etc.).

As shown in Table A illustrating one possible type of bit representation, the priority register 261 is a 16-bit register which may be programmed by the microcontroller 205 for setting access priorities of the C2-bus masters. Two priority bits are allocated for each C2-bus master to provide four priority levels to support the C2-bus masters, where the "highest" priority level is represented by activating both priority bits ("11") and the "lowest" priority level is represented by deactivating both priority bits ("00") as described in Appendix A. Therefore, the range of possible priority levels that can be assigned to a C2-bus master are, in descending order: (i) "11", (ii) "10", (iii)"01"and (iv) "00". However, two or more C2-bus masters having the same priority access levels may be supported. It is contemplated, however, that the priority register 261 may be altered to support any desired priority configuration or to comply with any specific application requirements.

TABLE A

| Bit Representation of the Priority Register | | | | | | | |
|---|---|---|---|---|---|---|---|
| 15 | 14 | 13 | 12 | 11 | 10 | 9 | 8 |
| X | X | EP1 | EP0 | X | X | DSP21 | DSP20 |
| 7 | 6 | 5 | 4 | 3 | 2 | 1 | 0 |
| X | X | DSP11 | DSP10 | X | X | MAD1 | MAD0 |

For example, suppose the computer system is executing an application that requires a DMA transfer to be performed as fast as possible. This requirement can be accomplished by activating bits [1:0] of the priority register which, in turn, precludes either DSP1 or DSP2 from interrupting access of the C2-bus by the microcontroller or halting a DMA transfer. The lettering "MAD" denoted in bit representations or signal identifications indicates that it is related to both the microcontroller or the Arbiter/DMA element since these elements share C2-bus request and arbitration logic. This makes for a more efficient design as the microcontroller resides in an "Idle" state during DMA transfers.

Similarly, as shown in Table B and described in Appendix B, the status register also may be configured as a 16-bit register. The OFF bit (bit 15) of the status register is active to indicate that a C2-bus master, having a higher priority than another C2-bus master currently accessing the C2-bus (referred to generically as a "current C2-bus master"), is requesting C2-bus ownership. The REQOFF bit (bit 14) is asserted whenever an application requires the microcontroller to be locked to the C2-bus for exclusive C2-bus access. Furthermore, two nibbles of the status register, namely bits [3:0] and bits[11:7], are used to indicate the status of the C2-bus masters i.e., whether (i) DSP1, (ii) DSP2, (iii) the external processor or (iv) the microcontroller or the Arbiter/DMA element currently owns the C2-bus or is requesting access to the C2-bus, respectively.

TABLE B

| Bit Representation of the Status Register | | | | | | | |
|---|---|---|---|---|---|---|---|
| 15 | 14 | 13 | 12 | 11 | 10 | 9 | 8 |
| OFF | REQOFF | X | X | EPR | DSP2R | DSP1R | MADR |
| 7 | 6 | 5 | 4 | 3 | 2 | 1 | 0 |
| X | X | X | X | EPO | DSP2O | DSP1O | MADO |

Figure 4:
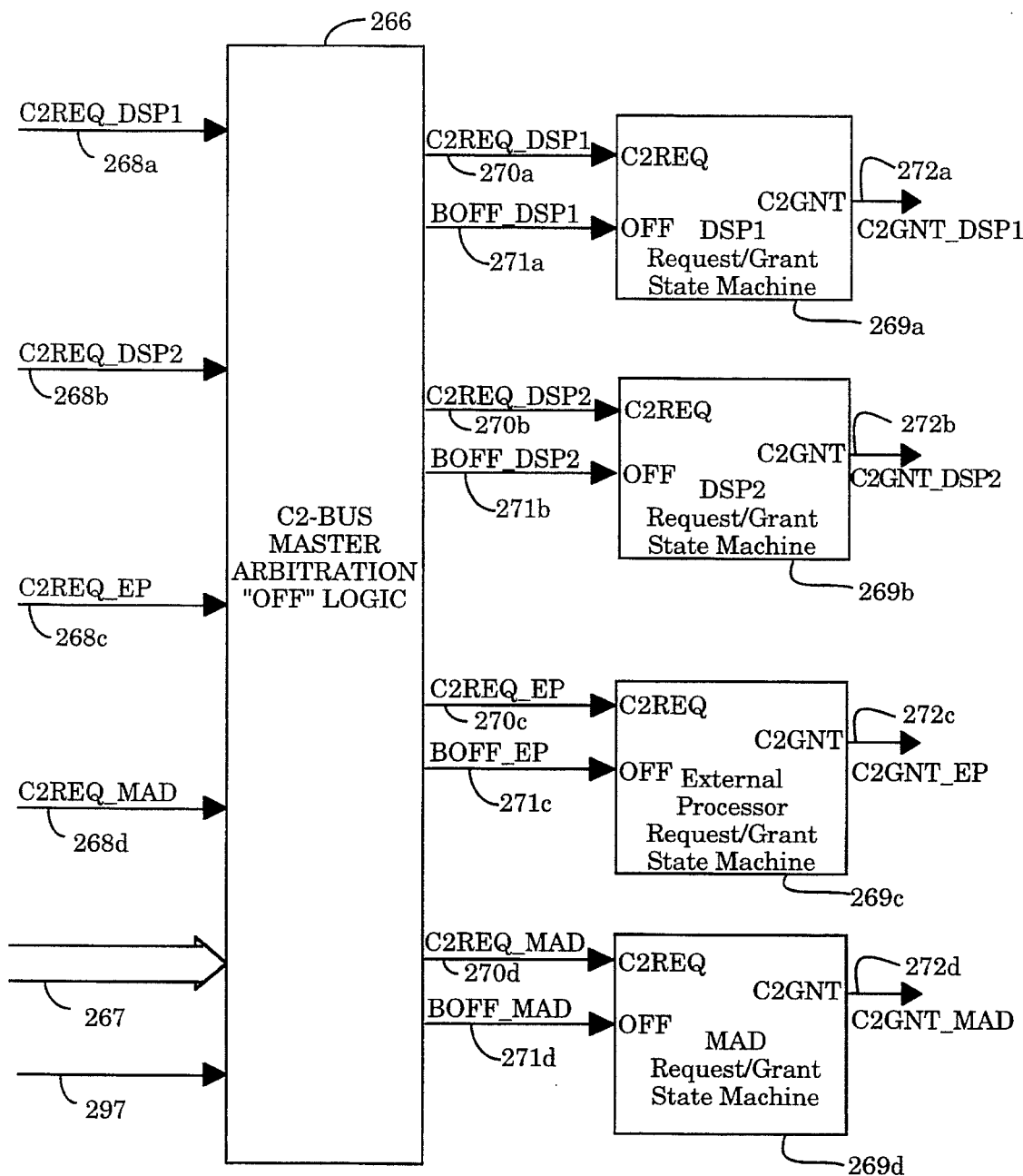
FIG. 4 is a block diagram of the functions of the C2-bus arbitration element of FIG. 3.

Referring now to FIG. 4, the C2-bus arbitration element 265 is a combination of state machines and conventional logic which collectively operates to grant C2-bus ownership to any requesting C2-bus master in accordance with the priority register. The C2-bus arbitration element 265 includes a C2-bus master arbitration "OFF" logic 266 which receives as input priority and status information from the control registers 260 through bi-directional communication lines 267. In addition, the C2-bus master arbitration "OFF" logic 266 receives as input C2-bus request ("C2REQ") signals through corresponding C2-bus request control lines 268a–268c, more specifically "C2REQ_DSP1", "C2REQ_DSP2" and "C2REQ_EP" signals directly from C2-bus masters DSP1, DSP2 and the external processor, respectively. However, the C2-bus master arbitration "OFF" logic 266 does not receive a C2REQ signal directly from the microcontroller since it, as most processors, is not configured to request bus ownership of or acknowledge a grant from a second communication bus, namely the C2-bus. As a result, the microcontroller C2-bus master logic 280 (see FIG. 3) enables the microcontroller to access the C2-bus by generating a C2REQ_MAD signal through a C2-bus control line 268d whenever the microcontroller attempts to access the address space allocated for devices residing on the C2-bus.

Based on these inputs, the C2-bus master arbitration "OFF" logic 266 outputs a number of Bus Off ("BOFF") signals "BOFF_DSP1", "BOFF_DSP2", "BOFF_EP" and "BOFF_MAD". These BOFF signals are asserted to represent certain conditions where the current C2-bus master is required to relinquish ownership of the C2-bus or to prevent a C2-bus master from obtaining the C2-bus. For example, the current C2-bus master may be signaled to relinquish C2-bus ownership to another C2-bus master having higher access priority that is requesting access to the C2-bus. A number of these conditions are listed in Appendix C for each of the above-identified C2-bus masters, although such list is not exhaustive for these conditions or these types of C2-bus masters.

The originally input C2REQ signals and the BOFF signals are appropriately input into the Request/Grant state machines 269a–269d through control lines 270a–270d and 271a–271d, respectively. The Request/Grant state machines 269a–269d, in turn, are coupled to the C2-bus masters and the microcontroller C2-bus master logic through C2-bus Grant control lines 272a–272d. Each Request/Grant state machine 269a–269d determines when its associated C2-bus master is allowed access to the C2-bus through assertion of a corresponding C2-bus Grant ("C2GNT") signal, namely, C2GNT_DSP1, C2GNT_DSP2, C2GNT_EP and C2GNT_MAD respectively, or is required to relinquish or temporarily halt such access of the C2-bus through de-assertion of these C2GNT signals.

For illustrative purposes, a specific example has been created to explain the operation of a C2-bus arbitration element, but is in no way a limitation on the scope of the present invention. For example, a C2-bus master such as the DSP1 asserts the C2REQ_DSP1 signal by activating the C2-bus Request control line 268a. If the C2-bus is available, the Request/Grant state machine 269a activates the C2-bus Grant control line 272a thereby returning the C2GNT_DSP1 signal to the DSP1. After the DSP1 no longer requires control of the C2-bus, it deactivates its C2-bus Request control line 268a causing both the C2REQ_DSP1 and C2GNT_DSP1 signals to be de-asserted.

In the event that the C2-bus is being used by another C2-bus master (e.g., DSP2) and DSP1 has a higher priority than DSP2 and is requesting the C2-bus, the C2-bus master arbitration "OFF" logic 266 activates control line 271b which inputs an active BOFF_DSP2 signal into the DSP2's Request/Grant state machine 269b. As a result, the C2GNT_DSP2 signal is de-asserted wherein the DSP2 enters into its "Ungrant" state as discussed below with reference to FIG. 5. Although its C2GNT_DSP2 signal has been de-asserted, the DSP2 maintains ownership of the C2-bus until completion of the current C2-bus transaction. Thereafter, the DSP2 de-asserts its C2REQ_DSP2 signal to enable DSP1 to access the C2-bus. However, if DSP2 has a greater access priority then DSP1, the C2-bus master arbitration "OFF" logic 266 does not assert the BOFF_DSP2 signal. Instead, the DSP1 waits for relinquishment of the C2-bus by the DSP2. In the event that the DSP2 and DSP1 have the same access priority and request the C2-bus simultaneously, the C2-bus is awarded in the following descending order: (i) microprocessor or Arbiter/DMA element, (ii) DSP1, (iii) DSP2 and (iv) the external processor.

Figure 5:
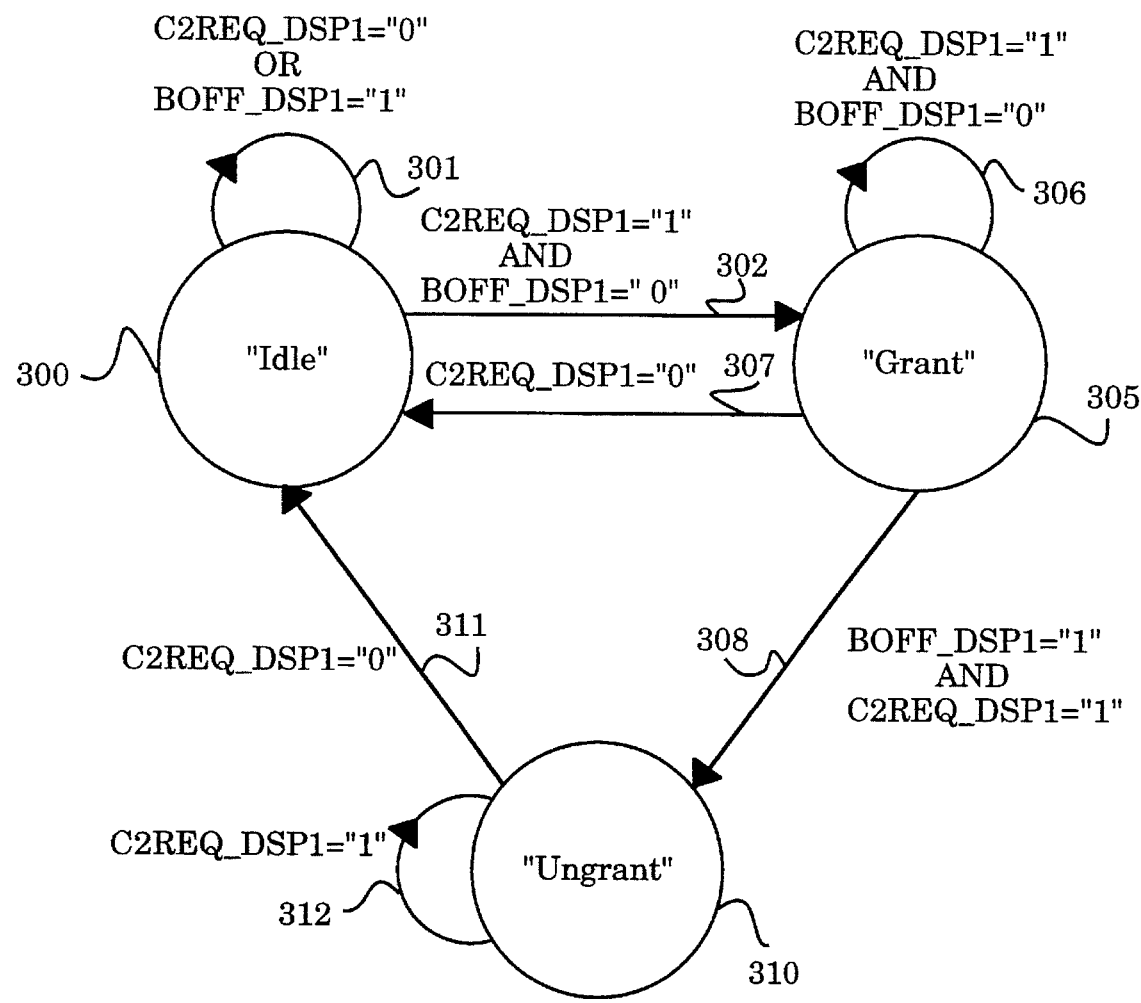
FIG. 5 is a state diagram of the operations of a Request/Grant state machine employed within the C2-bus arbitration element of FIG. 4.

As shown in a state diagram in FIG. 5, each of the Request/Grant state machines enables its associated C2-bus master to exist in one of three states "Idle", "Grant" or "Ungrant" as denoted by circles 300, 305 and 310. Since these Request/Grant state machines operate in an identical manner, the Request/Grant state machine for the DSP1 is arbitrarily described. The "Idle" and "Ungrant" states 300 and 310 have two state transitions represented by arrows 301–302 and 311–312 while the "Grant" state 305 has three transitions 306–308. The "Idle" state 300 represents a condition when DSP1 is not requesting access to the C2-bus (i.e., the C2REQ_DSP1 signal is de-asserted) or is precluded from accessing the C2-bus because its BOFF_DSP1 signal is asserted as shown by state transition 301. Moreover, DSP1 will exist in the "Idle" state 300 if it de-asserts its C2REQ_DSP1 signal while residing in the "Ungrant" state 310 in order to relinquish ownership of the C2-bus to another C2-bus master with a higher access priority as denoted by transition 311.

The "Grant" state 305 represents a state when DSP1 is granted access to the C2-bus. The DSP1 remains in the "Grant" state 305 as long as the C2REQ_DSP1 signal is asserted (logic "1") and BOFF_DSP1 is de-asserted (logic "0") as shown in transition 306. In the event that C2REQ_DSP1 is de-asserted, the Request/Grant state machine transitions back to the "Idle" state 300 as denoted by transition 307. Moreover, if the Request/Grant state machine receives an asserted BOFF_DSP1 signal from the C2-bus master arbitration "OFF" logic, state transition 308 is performed and the DSP1 would exist in the "Ungrant" state 310. The "Ungrant" state 310 represents that a C2-bus master with a higher access priority than DSP1 has requested access of the C2-bus. As denoted by state transition 312, the DSP1 may continue its current transaction until completion, wherein it de-asserts its C2REQ_DSP1 signal to return to the "Idle" state 300.

Referring back to FIG. 3, the C1-bus arbitration element 275 determines which C1-bus master (e.g., the external peripheral device 175 (see FIG. 2) or the Arbiter/DMA element 220) receives access to the C1-bus from the microcontroller. The Arbiter/DMA element 220 only requests access to the C1-bus in response to the microprocessor, DSP1 or DSP2 requesting a DMA transfer. The access priority to the C1-bus is fixed wherein the external peripheral device, such as a PCMCIA card, generally receives higher priority than the Arbiter/DMA element 220. It is contemplated, however, that the access priority for C1-bus masters could be programmable.

Upon receiving a C1-bus Request from the external peripheral device or the Arbiter/DMA element 220, the C1-bus arbitration element 275 transmits a HOLD signal to the microcontroller through a first C1-bus control line 276 in an attempt to gain access to the C1-bus. At an appropriate time, the microcontroller transmits a Hold Acknowledge ("HLDA") signal to the Arbiter/DMA element 220 through a second C1-bus control line 277 signaling that the microcontroller has relinquished control of the C1-bus. Thereafter, the C1-bus arbitration element 275 arbitrates HLDA between the C1-bus masters, providing such access to the C1-bus master having the highest priority. If the HOLD signal is based on a C1-bus request by the Arbiter/DMA element 220, the C1-bus arbitration element 275 forwards the arbitrated HLDA signal ("AHLDA signal") to the Arbiter/DMA element 220 via a third C1-bus control line 278.

Referring still to FIG. 3, the microcontroller C2-bus master logic 280 contains C2-bus request logic to assert the C2REQ_MAD signal on behalf of the microcontroller for C2-bus ownership or alternatively, on behalf of the Arbiter/DMA element 220 for DMA transfers. The microcontroller C2-bus master logic 280 determines that the microcontroller, not the Arbiter/DMA element 220, is attempting to access the C2-bus if the microcontroller is attempting to access C2-bus address space allocated in C1-bus memory. Thus, the C2-bus request logic located in the microcontroller C2-bus master logic 280, the MAD Request/Grant state machine 269d and the MAD portion of the C2-bus master arbitration "OFF" logic 266 (see FIG. 4) may be used in a redundant fashion since the microcontroller exists in an "Idle" state when the Arbiter/DMA element is performing a DMA transfer. The internal operations of the microcontroller C2-bus master logic 280 for a C2-bus access by the microcontroller is illustrated through a state diagram representation in FIG. 6. The decode of the states in this diagram provides the necessary control of the C2-bus signals (i.e., C2-bus read, C2-bus write, C2-bus address and data drivers) on behalf of the microcontroller.

Figure 6:
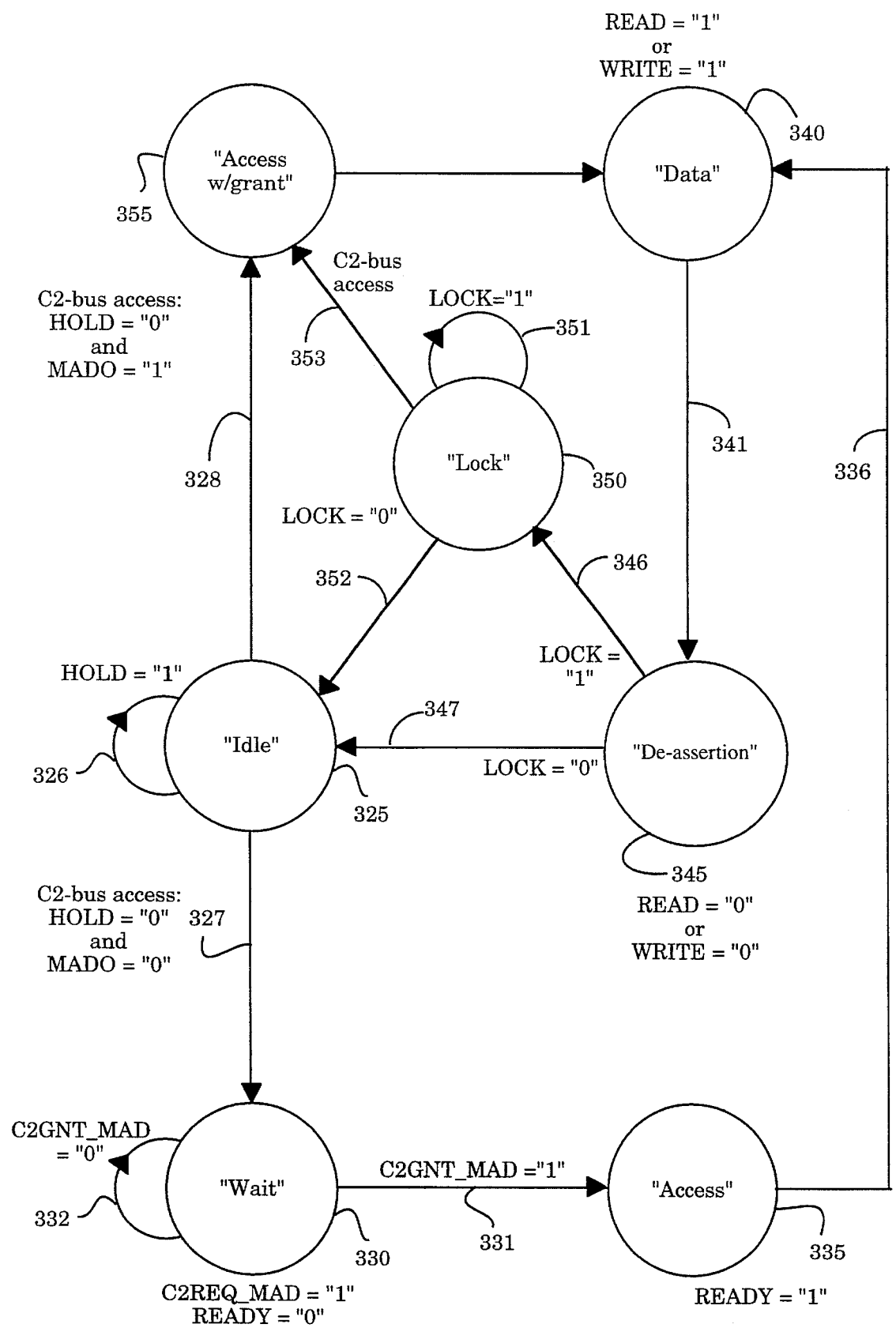
FIG. 6 is a state diagram of the operations of the microcontroller C2-bus master logic during a C2-bus access attempt by the microcontroller of FIG. 2.

Referring to FIG. 6, the microcontroller C2-bus master logic 280 initially rests in an "Idle" state 325. As shown by state transition 326, the microcontroller C2-bus master logic remains in the "Idle" state 325 whenever a C1-bus master other than the microcontroller e.g., the external peripheral device 175 or the Arbiter/DMA element 220 (see FIG. 2) is accessing the C1-bus (HOLD ="1"). When the microcontroller has control of the C1-bus (HOLD ="0") and attempts to access the C2-bus, the microcontroller C2-bus master logic transitions to a "Wait" state 330 as shown by state transition 327. In the "Wait" state 330, the C2REQ_MAD signal is asserted and the microcontroller is signaled to "wait" via a control signal (i.e., the "READY" signal de-asserted) 281 (see FIG. 3) before continuing the C2-bus access. The microcontroller C2-bus master logic will remain in the "Wait" state 330 via transition state 332 until the MAD Request/Grant state machine 269d of the C2-bus Arbitration element 265 (see FIG. 4) asserts the C2GNT_MAD signal.

Upon receipt of the asserted C2GNT_MAD signal, the microcontroller C2-bus master logic enters into an "Access" state 335 as denoted by state transition 331. During the "Access" state 335, the microcontroller is signaled to continue the C2-bus access (i.e., the "READY" control signal 281 is asserted) and the microcontroller C2-bus master logic prepares the C2-bus for a memory sequence by the microcontroller (i.e., it begins driving the C2-bus control signals). Thereafter, the transition to a "Data" state 340 through state transition 336 occurs in which the microcontroller reads data from or writes data onto the C2-bus. The next transition de-asserts the C2-bus READ or WRITE control signal as denoted by the "De-assertion" state 345 via state transition 341. Afterwards, the microcontroller C2-bus master logic either returns to the "Idle" state 325 via state transition 347 or transitions to a "Lock" state 350 via state transition 346.

A transition to the "Lock" state 350 occurs when the microcontroller asserts the "LOCK" control signal 282 (see FIG. 3) in response to executing an instruction containing the "LOCK" prefix. This prefix may be used in conjunction with a multi-cycle instruction, such as a read-modify write, to prevent any device from obtaining either the C1-bus or the C2-bus until the instruction is complete. The microcontroller C2-bus master logic will remain in the "Lock" state 350 via state transition 351 until either the "LOCK" control signal 282 goes inactive or the microcontroller performs another C2-bus access. If the former condition occurs, S the microcontroller C2-bus master logic returns to the "Idle" state 325 via state transition 352 indicating the completion of the microcontroller's C2-bus access. If the later condition occurs, the microcontroller C2-bus master logic transitions to the "Access with Grant" state 355 via transition path 353 and prepares the C2-bus for another memory sequence by the microcontroller.

In the event that the microcontroller already has ownership of the C2-bus, the microcontroller C2-bus master logic transitions to the "Access with Grant" state 355 along transition path 328 when the microcontroller accesses the C2-bus. This transition occurs when the REQOFF bit in the status register (see Appendix B) is used to request the C2-bus for the microcontroller. Unlike the above-described microcontroller C2-bus access which temporarily "ties-up"

the microcontroller while it waits for C2-bus ownership (i.e., C2GNT_MAD="1"), setting the REQOFF bit requests the C2-bus for the microcontroller while allowing the microcontroller to perform other processing tasks until the C2-bus arbitration element generates the C2GNT_MAD signal. When the microcontroller determines it owns the C2-bus by detecting an active MADO bit in the status register (see Appendix B), it performs a C2-bus access and the microcontroller C2-bus master logic transitions from the "Idle" state 325 to the "Access with Grant" state 355. Thereafter, similar to above, the microcontroller C2-bus master logic undergoes the operations associated with the "Data" state 340 and the "De-assertion" state 345 before returning to the "Idle" or "Lock" states 325 or 350.

Figure 7:
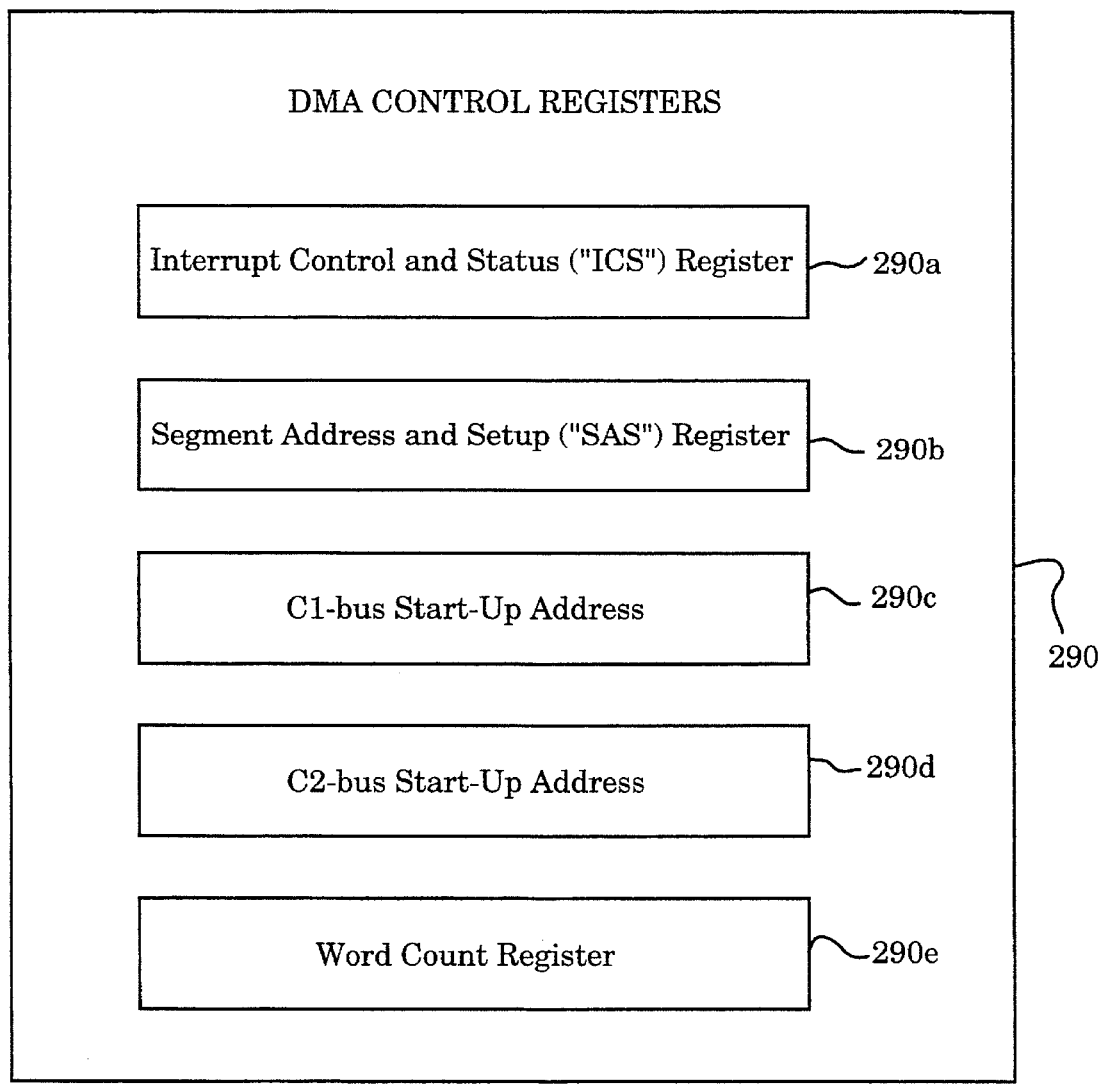
FIG. 7 is a block diagram of the DMA control registers which provide information to logic generating DMA interrupts, locking the processor requesting a DMA transfer to the C2-bus during a DMA transfer setup and storing performance parameters of the DMA transfer.

In order to perform a DMA transfer, the processor requesting the DMA transfer ("DMA processor") must transmit a request for a "DMA Idle" interrupt to the DMA control registers 290 of the Arbiter/DMA element 220 of FIG. 3. Referring to FIGS. 3 and 7, the DMA control registers 290 comprise at least five registers 290a–290e to support DMA transfers. The bit functionality of one embodiment of these DMA control registers is described in Tables D-1–D-5 of Appendix D. The first DMA control register is referred to as an Interrupt Control and Status ("ICS") Register 290a which indicates whether a DMA transfer is in progress, which processor (i.e., the microcontroller, DSP1 or DSP2) is currently requesting a DMA transfer and whether a DMA transfer has been halted due to an interrupt to the microcontroller. The ICS register 290a provides information to the DMA interrupt/C2-bus locking logic 295 through a bus line 291. If such information indicates that no other DMA transfers are in progress, the DMA interrupt/C2-bus locking logic 295 immediately generates a "DMA Idle" interrupt through a control line 296 for transmission to the requesting DMA processor. It also automatically "locks" the DMA processor to the C2-bus via control line 297 to the C2-bus arbitration element 265 effectively making the DMA processor the highest priority C2-bus master, so that the DMA processor may set up the DMA transfer without being interrupted by other processors.

The DMA Idle interrupt requests are prioritized according to the programmed access priority of the priority register. This ensures that a DMA processor's priority in setting up a DMA transfer equates to the priority it has over activity on the C2-bus. If two or more equal priority C2-bus masters have pending DMA Idle interrupt requests, the priority defaults in the descending order of (i) microcontroller, (ii) DSP1 and (iii) DSP2. After the DMA processor has appropriately input the requisite parameters of the DMA transfer into the remaining DMA control registers 290, described below, the DMA interrupt/C2-bus locking logic 295 unlocks the DMA processor from the C2-bus and the DMA transfer is performed by the DMA transfer state machine 285.

When the transfer is complete, the DMA interrupt/C2-bus locking logic 295 automatically generates a "DMA Complete" interrupt through a control line 298 to the DMA processor that initiated the DMA transfer. If, at the end of the transfer, another request for a "DMA Idle" interrupt is pending by another processor, the above-described process repeats. If there are more than one DMA Idle interrupt requests pending, the highest priority processor receives the interrupt while the lower priority processor's request remains pending. A processor must wait for it's current DMA transfer to complete before requesting another.

A second DMA control register is referred to as a Segment Address and Setup ("SAS") register 290b which sets the C1-bus segment address, the direction of the DMA transfer (e.g., C1-bus to C2-bus and vice versa) and the response(s) by the Arbiter/DMA element to interrupt(s) made to the microcontroller. Refer to Table D-2 of Appendix D for further elaboration.

A third and fourth DMA control registers referred to as a C1-bus Start Address ("C1SA") register 290c and a C2-bus Start Address ("C2SA") register 290d stores the starting addresses of the data on the C1-bus and C2-bus, respectively. Both registers increment as the "word count" changes during the DMA transfer to indicate the address of the next scheduled word transfer on their respective C-buses. In this embodiment, the C2-bus addressable memory space is mapped into a 64 kilobyte block of C1-bus address space. In order to transfer data correctly from the C1-bus byte aligned address space to the C2-bus word aligned address space, and vice versa, all C2-bus accesses must be even-boundary word accesses thereby requiring 15 bits for addressing. However, the number of address bits depends upon the amount of addressable memory space allocated to the C1-bus and C2-bus.

The fifth DMA control register is referred to as a Word Count ("WC") register 290e representing the number of words to be transferred between the C2-bus bus and the C1-bus. This register decrements to reflect the number of words remaining to be transferred. In this embodiment, the number of words may not exceed 512 due to the effort to keep the circuit size of the individual memory bank small and the fact that the banks did not all reside in a contiguous address space. Upon loading the WC register 290e, the DMA processor is unlocked from the C2-bus and the DMA transfer is started by asserting a DMA Pending signal through a control line 292.

Referring back to FIG. 3, the DMA transfer state machine 285 is an element whose decoded states drive various control signals on the C1-bus and C2-bus to enable a DMA transfer to occur upon gaining access to the C-buses. The DMA transfer state machine 285 performs the DMA transfer based on the information stored within the DMA control registers 290 and various states machines employed within the C1-bus arbitration element 275 and the C2-bus arbitration element 265. Upon being requested to perform a DMA transfer, the DMA transfer state machine 285 communicates with the C1-bus arbitration element 275 to transmit the HOLD signal to the microcontroller 205 and with the C2-bus request logic residing in the microcontroller C2-bus master logic 280 to produce a C2REQ_MAD signal to the C2-bus arbitration element 265.

Based on these requests, the DMA transfer state machine monitors a first and second control lines 272d and 278 for the C2GNT_MAD signal produced from the MAD Request/Grant state machine employed within the C2-bus arbitration element 265 and the AHLDA signal from the C1-bus arbitration element 275, respectively. When both control signals are active, the DMA transfer state machine has access to both C-buses. The DMA transfer state machine 285 further monitors another control line 286 to determine whether the microcontroller has received an interrupt to remove the microcontroller from the "Idle" state. The Arbiter/DMA unit 220 may be programmed such that it acknowledges these interrupts and relinquishes bus ownership of the C1-bus to enable the microcontroller to service the interrupt. This permits DMA transfers to be halted in order that time critical microcontroller functions may be processed without having to wait for a lengthy DMA transfer to complete.

Figure 8:
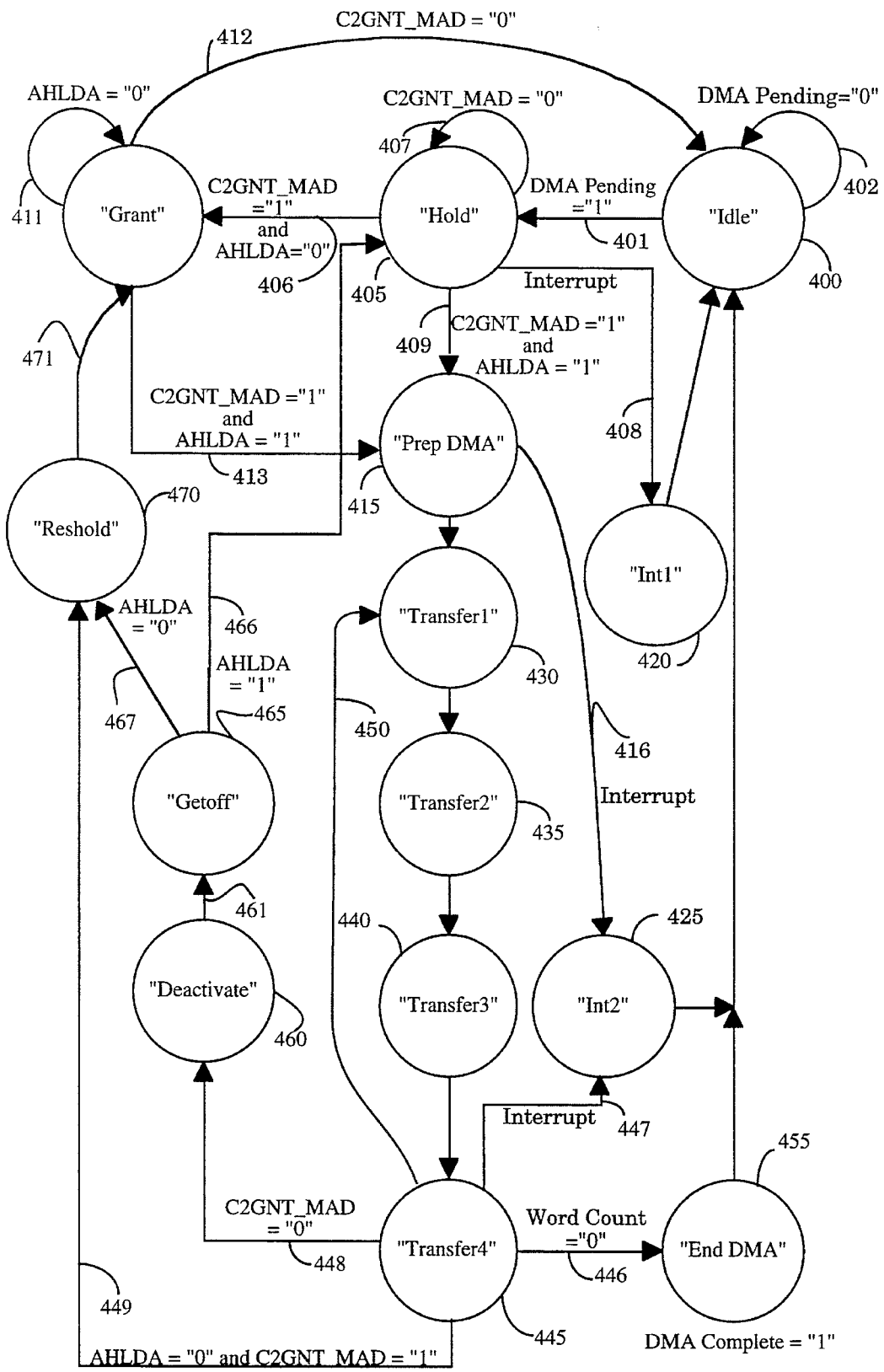
FIG. 8 is a state diagram of the operations of the DMA transfer state machine in performing a DMA transfer with the assistance of various state machines employed in the C2-bus arbitration element and the C1-bus arbitration element.

The operations of the DMA transfer state machine in performing the DMA transfer is shown in a state diagram in FIG. 8. Referring now to FIG. 8, the DMA transfer state machine rests in an "Idle" state 400 via state transition 402 until information is written into the WC register by the DMA processor. This causes assertion of a DMA Pending signal which starts the DMA transfer. Thus, the DMA transfer state machine transitions from the "Idle" state 400 to a "Hold" state 405 as denoted by a first state transition 401.

In the "Hold" state 405, the DMA transfer state machine interacts with the C2-bus request logic causing it to transmit a C2REQ_MAD signal into the C2-bus arbitration element, namely the C2-bus master arbitration "OFF" logic and the MAD Request/Grant state machine, in an attempt to gain access to the C2-bus. This state machine and logic may be used since the microcontroller is idle during a DMA transfer. The DMA transfer state machine further interacts with the C1-bus arbitration state machine causing it to generate a HOLD signal to the microcontroller in an attempt to gain access to the C1-bus. Upon receiving the HOLD signal, the microcontroller goes into the "Idle" state and asserts a Hold Acknowledge ("HLDA") signal indicating that it relinquishes the C1-bus. The C1-bus arbitration element then arbitrates HLDA between the C1-bus masters giving the arbitrated HLDA signal, namely "AHLDA", to the highest priority C1-bus master requesting the C1-bus.

A first state transition from the "Hold" state 405 is to the "Grant" state 410 as denoted by state transition 406. This state transition occurs when the DMA transfer state machine receives the asserted C2GNT_MAD signal prior to receipt of the AHLDA signal. In the "Grant" state 410, the Arbiter/DMA element is still unable to begin DMA transfers until it gains access to the C1-bus acknowledged by assertion of the AHLDA signal.

Therefore, as shown by state transition 411, the DMA transfer state machine remains in the "Grant" state 410 until either (i) the DMA transfer state machine receives the AHLDA signal or (ii) one of the DSPs with an access priority greater than the microcontroller requests access to the C2-bus before the DMA transfer state machine receives the AHLDA signal. If the first condition occurs, the DMA transfer state machine enters into a "PrepDMA" state 415, as denoted by state transition 413, to establish ownership of the C-buses and to start driving control signals before starting the bus cycles of the DMA transfer. Otherwise, the DMA transfer state machine de-asserts the C2REQ_MAD signal to temporarily relinquish ownership of the C2-bus to the DSP by transitioning to the "Idle" state 400 as denoted by state transition 412. However, since the DMA Pending signal is still asserted, the DMA transfer state machine transitions to the "Hold" state 405 to re-request the C2-bus by re-asserting the C2REQ_MAD signal.

A second state transition is to remain in the "Hold" state 405 as denoted by state transition 407. This second state transition occurs as long as the C2GNT_MAD signal is not asserted indicating the DMA state machine does not have ownership of the C2-bus.

If an application requires a time critical operation by the microcontroller, it generates an interrupt to the microcontroller. If the Arbiter/DMA element is programmed via the SAS register to acknowledge this interrupt, the DMA transfer state machine propagates to the first interrupt "Int1" state 420 via state transition 408 which halts the DMA transfer. It then returns to the "Idle" state 400 where the Arbiter/DMA element de-asserts the HOLD and C2REQ_MAD signals to relinquish ownership of the C-buses. Depending on how the Arbiter/DMA element is configured, the DMA transfer is resumed either automatically due to the occurrence of a return-from-interrupt instruction or by manually restarting it.

Upon the Arbiter/DMA element receiving the C2GNT_MAD and AHLDA signals as shown in state transitions 409 and 413, the DMA transfer state machine enters into the "PrepDMA" state 415. At this point, the Arbiter/DMA element is driving control signals of both C-buses. Two state transitions may occur from the "PrepDMA" state 415. The first transition occurs when the microcontroller receives an interrupt while the Arbiter/DMA element resides in the "Grant" state 410.

If the Arbiter/DMA element 200 is programmed to acknowledge this interrupt, the DMA transfer state machine halts the DMA transfer and transitions to a second interrupt "Int2" state 425 via transition 416. In this state, it prepares to transfer ownership of the C1-bus to the microcontroller by de-asserting the C1-bus control signals. It then returns to the "Idle" state 400 where the Arbiter/DMA element de-asserts the HOLD and C2REQ_MAD signals to relinquish ownership of the C-buses. The difference between the "Int1" and "Int2" states is that the former occurs when the Arbiter/DMA element is not yet driving the C1-bus control signals whereas the latter state is for the case where the Arbiter/DMA element is driving the C1-bus. The DMA transfer is resumed as previously discussed.

If the DMA transfer state machine transitions to the "PrepDMA" state 415 without any interrupts to the microcontroller, the actual DMA transfer may begin. The C1-bus is a four cycle bus, a characteristic of an Intel®x86 microcontroller used in the present invention, while the C2-bus is a single cycle bus. Because of the former, there exists four data transfer states "Transfer1" 430, "Transfer2" 435, "Transfer3" 440 and "Transfer4" 445. These data transfer states mimic the cyclic activity of the C1-bus and are decoded and used to control the C1-bus signals (e.g., C1-bus read, C1-bus write, C1-bus address and data drivers). This enables the Arbiter/DMA element to simulate the operations of the microcontroller so that DMA transfers are transparent to those peripherals coupled to the C1-bus to facilitate normal operations while a DMA transfer is in progress. Other processors may require a different number of states due to the different number cycles in their bus memory sequences.

Upon reaching the "Transfer4" state 445, the DMA transfer state machine monitors certain current conditions in a given priority to determine which of five possible state transitions to follow. The DMA transfer state machine first determines if the WC register is equal to "zero" which, if true, would indicate that the DMA transfer has been completed. If the WC register is equal to "zero", the DMA transfer state machine transitions to an "EndDMA" state 455 via state transition 446. Here, the DMA transfer state machine clears the DMA Pending signal and generates the DMA Idle and Complete interrupts. Thereafter, the DMA transfer state machine returns to the "Idle" state 400 where it de-asserts the HOLD and C2REQ_MAD signals thereby relinquishing control of both C-buses.

Upon determining that the WC register is not equal to "zero", the DMA transfer state machine determines whether the microcontroller has received an interrupt during the DMA transfer. If so, and if the Arbiter/DMA element is programmed to acknowledge it, the DMA transfer state machine propagates to the "Int2" state 425 via state transition 447 and performs as described above.

If the WC register is non-zero and the microcontroller has not received any interrupts, the DMA transfer state machine determines whether the C2GNT_MAD signal has been de-asserted during the DMA transfer due to a DSP. If the C2GNT_MAD signal has been de-asserted, the DMA transfer state machine transitions via state transition 448 to a "Deactivate" state 460 in which the DMA transfer state machine de-asserts the signals driving the C2-bus. Thereafter, as shown by state transition 461, the DMA transfer state machine proceeds to a "Getoff" state 465 where it de-asserts the C2REQ_MAD signal and determines if the AHLDA signal has been de-asserted at any time during the effort to give C2-bus ownership to the requesting DSP. If not, the DMA transfer state machine returns to the "Hold" state 405 via state transition 466 in which the C2REQ_MAD signal is re-initialized to request access to the C2-bus. If the AHLDA signal was de-asserted, as denoted by state transition 467, the DMA transfer state machine transitions to a Restricted Hold "Reshold" state 470 which signals the C1-bus arbitration element to transfer the AHLDA signal to the higher priority C1-bus master requesting the C1-bus. Since the DMA transfer state machine now has lost its C2GNT_MAD and AHLDA signals, it transitions from the "Reshold" state 470, through the "Grant" state 410 and into the "Idle" state 400 as denoted by state transitions 471 and 412. However, since DMA Pending is still asserted, the DMA transfer state machine transitions to the "Hold" state 405 re-asserting both the HOLD and C2REQ_MAD signals.

If the above-discussed three determinations have not occurred, the DMA transfer state machine checks whether the AHLDA signal has been de-asserted. If so, as denoted by state transition 449, the DMA transfer state machine enters into the "Reshold" state 470 to relinquish the C1-bus. Then, the DMA transfer state machine transitions to the "Grant" state 410 and remains in this state because the DMA transfer state machine still has control of the C2-bus.

If neither of the above-identified conditions have occurred, the DMA transfer state machine begins the next DMA word transfer as denoted by state transition 450. Thereafter, the DMA transfer state machine performs the same above-identified checks.

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follow.

Appendix A

| Bit | Name | Description |
|---|---|---|
| 15–14 | X | Reserved for future compatibility. |
| 13 | EP1 | External Processor C2-bus Priority Bits |
| 12 | EP0 | "00" = highest priority |
| | | "11" = lowest priority |
| 11–10 | X | Reserved for future compatibility. |
| 9 | DSP21 | DSP2 C2-bus Priority Bits |
| 8 | DSP20 | "00" = highest priority |
| | | "11" = lowest priority |
| 7–6 | X | Reserved for future compatiibility. |
| 5 | DSP11 | DSP1 C2-bus Priority Bits |
| 4 | DSP10 | "00" = highest priority |
| | | "11" = lowest priority |
| 3–2 | X | Reserved for future compatibility. |
| 1 | MAD1 | Microcontroller-Arbiter/DMA C2-bus Priority |
| 0 | MAD0 | Bits |

Appendix A -continued

| Bit | Name | Description |
|---|---|---|
| | | "00" = highest priority |
| | | "11" = lowest priority |
| | | The Arbiter/DMA Element and the Microcontroller share a Request/Grant state machine. Therefore, these bits also set the priority of a DMA transfer. |

Appendix B

| Bit | Name | Description |
|---|---|---|
| 15 | OFF | C2-bus OFF Bit |
| | | "1" = higher priority master requesting the C2-bus |
| | | If a bus master is locked to the C2-bus via the Arbiter/DMA element, it is effectively made the highest priority C2-bus master. In this case, the C2-bus OFF Bit never sets while the locked C2-bus master owns the C2-bus, regardless of the other C2-bus masters' priorities set in the priority register. A C2-bus master can be automatically locked to set up a DMA transfer or the microcontroller can be locked to the C2-bus via the REQuest Off Bit. |
| 14 | REQOFF | REQuest OFF Bit |
| | | Writing "1" causes the microcontroller to be locked to the C2-bus so it never loses its grant, regardless of its C2-bus priority. Writing "0" unlocks the microcontroller from the C2-bus (microcontroller accesses to the C2-bus when locked are slightly faster — no wait states vs. one wait state when not locked). This bit sets when the microcontroller is automatically locked to the C2-bus to set up a DMA transfer. It clears whenever the Word Count register is accessed by the microcontroller. |
| 13–12 | X | Reserved for furture compatability. |
| 11 | EPR | External Processor C2-bus Request Bit |
| | | "1" = External processor requesting the C2-bus |
| 10 | DSP2R | DSP2 C2-bus Request Bit |
| | | "1" = DSP2 requesting the C2-bus |
| 9 | DSP1R | DSP1 C2-bus Request Bit |
| | | "1" = DSP1 requesting the C2-bus |
| 8 | MADR | Microcontroller-Arbiter/DMA Request Bit |
| | | "1" = Microcontroller or Arbiter/DMA requesting C2-bus |
| 7–4 | X | Reserved for future compatiibility. |
| 3 | EPO | External Processor C2-bus Owner Bit |
| | | "1" = External processor owns the C2-bus |
| 2 | DSP2O | DSP2 C2-bus Owner Bit |
| | | "1" = DSP2 owns the E-bus |
| 1 | DSP1O | DSP1 C2-bus Owner Bit |
| | | "1" = DSP1 owns the E-bus |
| 0 | MADO | Microcontroller-Arbiter/DMA Owner Bit |
| | | "1" = Microcontroller or Arbiter/DMA owns the C2-bus. |

Appendix C

BOFF_MAD="1" if one of the following conditions is "true":

1. (Microprocessor—Arbiter/DMA element "MAD" priority lower than DSP1) AND (DSP1 is requesting C2-bus access) AND (MAD is NOT locked to the C2-bus); OR
2. (MAD priority lower than DSP2) AND (DSP2 is requesting C2-bus access) AND (MAD is NOT locked to the C2-bus); OR 3. (MAD priority lower than External Processor "EP") AND (EP is requesting C2-bus access) AND (MAD is NOT locked to the C2-bus); OR
4. (DSP1 owns the C2-bus); OR
5. (DSP2 owns the C2-bus); OR
6. (EP owns the C2-bus); OR
7. (DSP1 locked to the C2-bus to set up a DMA transfer); OR
8. (DSP2 locked to the C2-bus to set up a DMA transfer).

Appendix C—continued

BOFF_DSP1="1" if one of the following conditions is "true":

1. (DSP1 priority lower than MAD) AND (MAD is requesting C2-bus access) AND (DSP1 is NOT locked to the C2-bus to set tip a DMA transfer); OR
2. (DSP1 priority lower than DSP2) AND (DSP2 is requesting C2-bus access) AND (DSP1 is NOT locked to the C2-bus to set up a DMA transfer); OR
3. (DSP1 priority lower than EP) AND (EP is requesting C2-bus access) AND (DSP1 is NOT locked to the C2-bus to set tip a DMA transfer); OR
4. (MAD locked to the E-bus) AND (DSP2 is NOT locked to the C2-bus to set up a DMA transfer); OR
5. (MAD owns the C2-bus); OR
6. (DSP2 owns the C2-bus); OR
7. (EP owns the C2-bus); OR
8. (DSP1 has same priority as MAD) AND (MAD is requesting C2-bus access) AND (DSP1 doesn't own and is NOT locked to the C2-bus); OR
9. (DSP2 locked to the C2-bus to set up a DMA transfer).

Appendix C—continued

BOFF DSP2="1" if one of the following conditions is "true":

1. (DSP2 priority lower than MAD) AND (MAD is requesting C2-bus access) AND (DSP2 is NOT locked to the C2-bus to set up a DMA transfer); OR
2. (DSP2 priority lower than DSP1) AND (DSP1 is requesting C2-bus access) AND (DSP2 is NOT locked to the C2-bus to set up a DMA transfer); OR
3. (DSP2 priority lower than EP) AND (EP is requesting C2-bus access) AND (DSP2 is NOT locked to the C2-bus to set up a DMA transfer); OR
4. (MAD locked to the C2-bus) AND (DSP2 is NOT locked to the C2-bus to set up a DMA transfer); OR
5. (MAD owns the C2-bus); OR
6. (DSP1 owns the C2-bus); OR
7. (EP owns the C2-bus); OR
8. (DSP2 has same priority as MAD) AND (MAD is requesting C2-bus access) AND (DSP2 doesn't own and is NOT locked to the C2-bus); OR
9. (DSP2 has same priority as DSP1) AND (DSP1 is requesting C2-bus access) AND (DSP2 doesn't own and is NOT locked to the C2-bus); OR
10. (DSP1 locked to the C2-bus to set up a DMA transfer).

Appendix C—continued

BOFF EP="1" if one of the following conditions is "true":

1. (EP priority lower than MAD) AND (MAD is requesting C2-bus access); OR
2. (EP priority lower than DSP1) AND (DSP1 is requesting C2-bus access); OR
3. (EP priority lower than DSP2) AND (DSP2 is requesting C2-bus access); OR
4. (MAD locked to the C2-bus); OR
5. (MAD owns the C2-bus); OR
6. (DSP1 owns the C2-bus); OR
7. (DSP2 owns the C2-bus); OR
8. (EP has same priority as MAD) AND (MAD is requesting C2-bus access) AND (EP doesn't own the C2-bus); OR
9. (EP has same priority as DSP1) AND (DSP1 is requesting C2-bus access) AND (EP doesn't own C2-bus); OR
10. (EP has same priority as DSP2) and (DSP2 is requesting C2-bus access) AND (EP doesn't own the C2-bus); OR
11. (DSP1 locked to the C2-bus to set up a DMA transfer); OR
12. (DSP2 locked to the C2-bus to set up a DMA transfer).

Appendix D

TABLE D-1
Bit Functionality of One Embodiment of the ICS Register

| Bit | Name | Description |
| --- | --- | --- |
| 15 | X | Reserved for future compatibility. |
| 14 | BDSP2 | Busy Serving DSP2 Requested Transfer Bit "1" = DSP2 requested transfer in progress. An interrupt is automatically sent to DSP2 when the transfer is complete. |
| 13 | BDSP1 | Busy Serving DSP1 Requested Transfer Bit "1" = DSP2 requested transfer in progress. An interrupt is automatically sent to DSP1 when the transfer is complete. |
| 12 | BMAD | Busy Serving MAD Requested Transfer Bit "1" = microprocessor or Arbiter/DMA element requested transfer in progress. An interrupt is automatically sent to that element when the transfer is complete. |
| 11 | EHTD | Enable Write to HLTD Bit Write "1" to enable writing to the HLTD bit. Will always read "0". |
| 10 | HLTD | HALTED Bit This bit indicates that a transfer has been halted (i.e., suspended) and is waiting to be completed. Writing "0" to this bit clears a halt due to an interrupt to the microcontroller. However, if HALT bit is set, the HLTD bit remains a "1". This bit should never be cleared while any processor is locked to the bus. |
| 9 | EHLT | Enable Write to HALT Bit Write "1" to enable writing to the HALT bit. Will always read "0". |
| 8 | HALT | HALT Bit Write "1" to prevent the microcontroller from losing the C1-bus due to a DMA transfer. This bit is only effective if set and cleared by the microcontroller and should never be cleared while a processor is locked to the bus. |
| 7-6 | X | Reserved for future compatibility. |
| 5 | EDSP2 | Enable Write to IRDSP2 Bit Write "1" to enable writing to the IRDSP2 bit. Will always read "0". |
| 4 | EDSP1 | Enable Write to IRDSP1 Bit Write "1" to enable writing to the IRDSP1 bit. Will always read "0". |
| 3 | EMC | Enable Write to IRMC Bit Write "1" to enable writing to the IRMC bit. Will always read "0". |
| 2 | IRDSP2 | DSP2 Interrupt Request Bit Write "1" to request an interrupt to DSP2. Writing "0" cancels an unserviced interrupt request; it is automatically cleared when the interrupt is generated. The interrupt is immediately generated if a DMA transfer is not in progress or being set up; otherwise, the |

Appendix D

| | | |
|---|---|---|
| 1 | IRDSP1 | interrupt is generated at the end of a transfer. DSP1 Interrupt Request Bit Write "1" to request an interrupt to DSP1. Writing "0" cancels an unserviced interrupt request; it is automatically cleared when the interrupt is generated. The interrupt is immediately generated if a DMA transfer is not in progress or being set up; otherwise, the interrupt is generated at the end of a transfer. |
| 0 | IRMC | Microcontroller Interrupt Request Bit Write "1" to request an interrupt to the microcontroller. Writing "0" cancels an unserviced interrupt request; it is automatically cleared when the interrupt is generated. The interrupt is immediately generated if a DMA transfer is not in progress or being set up; otherwise, the interrupt is generated at the end of a transfer. |

TABLE D-2
Bit Functionality of One Embodiment of the SAS Register

| Bit | Name | Description |
|---|---|---|
| 15–12 | X | C1-bus Segment Address These bits are not toggled as the C1-bus address counter increments. |
| 11 | FAL | C1-bus Address Lock Bit Write "0" to have the C1-bus address increment with each word count. Write "1" to have the C1-bus address NOT increment as the word count changes. The latter permits the DMA transfer to be used with C1-bus peripherals. |
| 10 | DIR | Transfer Direction Bit Write "0" to transfer from C2-bus to C1-bus. Write "1" to transfer from C1-bus to C2-bus. |
| 9 | IOS | I/O Space Operation Bit Write "0" to indicated an I/O space C1-bus address. Write "1" to indicate a memory space C1-bus address. |
| 8–4 | X | Reserved for future compatibility. |
| 3 | EIC | Enable Write to Interrupt Control Bits Write "1" to enable writing to the interrupt control bits (0–2). Will always read "0". |
| 2 | X | Reserved for future compatibility. |
| 1 | EI | Enable Interrupt Bit Write "1" to enable an interrupt to the microcontroller to halt a transfer. Write "0" to ignore interrupts to the microcontroller, except an NMI. |
| 0 | EIR | Enable Interrupt Return Bit Write "1" to enable a return from interrupt instruction executed by the microcontroller to restart a halted transfer (i.e., to automatically clear HLTD). |

TABLE D-3
Bit Functionality of One Embodiment of the C1-bus Start Address Register

| Bit | Description |
|---|---|
| 15–1 | C1-bus Word Start Address Write as the C1-bus transfer word start address. When read this register contains the address of the next scheduled word transfer. The C1-bus address must be even byte aligned. This register does not increment as the word count changes if the FAL bit of the SAS Register is "1". |
| 0 | Reserved for future compatibility. |

TABLE D-4
Bit Functionality of One Embodiment of the C2-bus Start Address Register

| Bit | Description |
|---|---|
| 15 | Reserved for future compatibility. |
| 14–0 | C2-bus Word Start Address Write as the C2-bus transfer word start address. When read this register contains the address of the next scheduled word transfer. The register always increments as the word count changes during the transfer. |

TABLE D-5
Bit Functionality of the Word Count Register

| Bit | Description |
|---|---|
| 15–10 | Reserved for future compatibility. |
| 9–0 | Word Transfer Count These bits are loaded with the number of words to be transferred. During the transfer, the count is decremented to reflect the number of words remaining to be transferred. |

What is claimed is:

1. An apparatus coupled between a first bus and a second bus, said apparatus comprising:

arbitration means for arbitrating ownership of the first bus for a plurality of first bus masters and for arbitrating ownership of the second bus for a plurality of second bus masters, said arbitration means including a first arbitration element, a second arbitration element and at least one programmable storage means for providing programmable access priorities for each of said plurality of second bus masters to said second arbitration element, said second arbitration element awarding ownership of the second bus based on said access priorities; and DMA transfer means for performing a DMA transfer between a first component coupled to the first bus and a second component coupled to the second bus when the apparatus has simultaneous ownership of both the first and second buses, said DMA transfer means being coupled to said arbitration means.

2. The apparatus according to claim 1, wherein said second arbitration element arbitrating ownership of the second bus, said second arbitration element being coupled to a second bus request element through a control line, said second bus request element generating a control signal requesting ownership of the second bus through said control line in order for a first processor, coupled to the first bus, to obtain ownership of the second bus and alternatively, for the apparatus to obtain ownership of the second bus to perform said DMA transfer.

3. The apparatus according to claim 2, wherein the first arbitration element awarding ownership of the first bus to a selected first bus master requesting ownership of the first bus and having an access priority greater than any other first bus master requesting ownership of the first bus, said first arbitration element being coupled to a storage element for providing access priorities of each of said plurality of first bus masters to said first arbitration element.

4. The apparatus according to claim 3, wherein said DMA transfer means communicates with both said first arbitration element requesting said first arbitration element to award ownership of the first bus to the apparatus and said second bus request element to request said second arbitration element to award ownership of the second bus to the apparatus.

5. The apparatus according to claim 4, wherein said DMA transfer means performs said DMA transfer without interruption if the apparatus is associated with a higher access priority than any first bus masters and second bus masters requesting ownership to the first bus and second bus, respectively, during said DMA transfer.

6. The apparatus according to claim 5, wherein said DMA transfer means halts said DMA transfer when one of said plurality of second bus masters, having a greater access priority than the apparatus, generates a request control signal requesting access to the second bus and transmits said request control signal to said second arbitration element.

7. The apparatus according to claim 1, wherein said plurality of second bus masters includes (i) at least one auxiliary processor and (ii) said first processor and alternatively said apparatus for performing said DMA transfer.

8. An apparatus coupled between a first bus and a second bus, said apparatus comprising:
   a first arbitration element that arbitrates ownership of the first bus for a plurality of first bus masters, said first arbitration element being coupled to said plurality of first bus masters;
   a second arbitration element that arbitrates ownership of the second bus for a plurality of second bus masters, said second arbitration element being coupled to at least one of said plurality of second bus masters and a second bus request element generating a control signal to request ownership of the second bus in order to perform a DMA transfer;
   at least one programmable storage element coupled to said second arbitration element, said at least one programmable storage element provides programmable access priorities for each of said plurality of second bus masters; and
   a DMA transfer state machine coupled to said first arbitration element and said second arbitration element, said DMA transfer between a first component coupled to the first bus and a second component coupled to the second bus when the apparatus has simultaneous ownership of both the first and second buses.

9. The apparatus according to claim 8, wherein said plurality of second bus masters includes (i) at least one auxiliary processor and (ii) said first processor and alternatively said apparatus for performing said DMA transfer.

10. The apparatus according to claim 8, wherein said second arbitration element awards ownership of the second bus to a selected second bus master requesting ownership of the second bus, said selected second bus master having an access priority greater than any other second bus master requesting ownership of the second bus.

11. The apparatus according to claim 8, wherein said first arbitration element awards ownership of the first bus to a selected first bus master of said plurality of first bus masters, said selected first bus master requesting ownership of the first bus and having an access priority greater than any other first bus master requesting ownership of the first bus, said first arbitration element being coupled to a storage element that contains access priorities of each of said plurality of first bus masters to said first arbitration element.

12. The apparatus according to claim 8, wherein said DMA transfer state machine communicates with both said first arbitration element requesting said first arbitration element to award ownership of the first bus to the apparatus and said second bus request element to request said second arbitration element to award ownership of the second bus to the apparatus.

13. The apparatus according to claim 12, wherein said DMA transfer state machine performs said DMA transfer without interruption when the apparatus is associated with a higher access priority than any first bus masters and any second bus masters requesting ownership to the first bus and second bus, respectively, during said DMA transfer.

14. The apparatus according to claim 13, wherein said DMA transfer state machine halts said DMA transfer when one of said plurality of second bus masters, having a greater access priority than the apparatus, generates a request control signal requesting access to the second bus and transmits said request control signal to said second arbitration element in which said second arbitration element discontinues awarding ownership of the second bus to the apparatus and awards ownership of the second bus to said one of said plurality of second bus masters.

15. The apparatus according to claim 13, wherein said DMA transfer state machine halts said DMA transfer when one of said plurality of first bus masters, having a greater access priority than the apparatus, generates a second request control signal requesting access to the first bus and transmits said second request control signal to said first arbitration element in which said first arbitration element discontinues awarding ownership of the first bus to the apparatus and awards ownership of the first bus to said one of said plurality of first bus masters.

16. The apparatus according to claim 13, wherein said DMA transfer state machine halts said DMA transfer when said first processor receives an interrupt requiring said first processor to service said interrupt.

17. A computer system comprising:
   a first bus;
   a plurality of first bus masters coupled to the first bus, said plurality of first bus masters including a first component including one of a first processor and a first memory element;
   a second bus;
   a plurality of second bus masters coupled to the second bus, said plurality of second bus masters including a second component including one of an auxiliary processor and a second memory element; and
   an arbiter/DMA element coupled to said first bus and to said second bus, said arbiter/DMA element including:
      a first arbitration element that arbitrates ownership of the first bus for the plurality of first bus masters including said arbiter/DMA element for supporting a DMA transfer,
      a second arbitration element that arbitrates ownership of the second bus for the plurality of second bus masters including said arbiter/DMA element for supporting a DMA transfer, and
      a DMA transfer state machine coupled to said first arbitration element and said second arbitration element, said DMA transfer state machine performs said DMA transfer between the first component and the second component when said arbiter/DMA element has simultaneous ownership of both the first and second buses.

18. The computer system according to claim 17, wherein said second arbitration element is coupled to a second bus request element through a control line, said second arbitration element generating a control signal requesting ownership of the second bus through said control line in order for said first processor of the plurality of first bus masters to obtain ownership of the second bus and alternatively, for said arbiter/DMA element to obtain ownership of the second bus to perform said DMA transfer.

19. The computer system according to claim 18, wherein said second arbitration element is further coupled to at least one programmable storage element, said at least one programmable storage element providing programmable access priorities for each of said plurality of second bus masters to said second arbitration element.

20. The computer system according to claim 17, wherein said first arbitration element awards ownership of the first bus to a selected first bus master when said selected first bus master is requesting ownership of the first bus and has an access priority greater than any other first bus master requesting ownership of the first bus, said first arbitration element being coupled to a storage element that provides access priorities of each of said plurality of first bus masters.

21. The computer system according to claim 17, wherein said DMA transfer state machine communicates with both said first arbitration element requesting said first arbitration element to award ownership of the first bus to said arbiter/DMA element and said second bus request element to request said second arbitration element to award ownership of the second bus to said arbiter/DMA element.

22. The computer system according to claim 17, wherein said DMA transfer state machine performs said DMA transfer without interruption when said arbiter/DMA element is associated with a higher access priority than any other first bus masters and second bus masters requesting ownership to the first bus and second bus, respectively, during said DMA transfer.

23. The computer system according to claim 17, wherein said DMA transfer state machine halts said DMA transfer when one of said plurality of second bus masters, having a greater access priority than said arbiter/DMA element, generates a request control signal requesting access to the second bus and transmits said request control signal to said second arbitration element in which said second arbitration element discontinues awarding ownership of the second bus to the arbiter/DMA element and awards ownership of the second bus to said one of said plurality of second bus masters.

24. A computer system comprising:
a plurality of first bus masters including a first component, said first component including at least one of processor means for processing information and first storage means for storing said information;
first bus means for coupling together said plurality of first bus masters;
a plurality of second bus masters including a second component, said second component including at least one of auxiliary processor means for processing information and second storage means for storing said information processed by said at auxiliary processor means and for storing application-related information;
second bus means for coupling together said plurality of second bus masters; and
arbiter/DMA means for arbitrating ownership of said first and second bus means and performing a DMA transfer between said first bus means and said second bus means, said arbiter/DMA means including:
arbitration means for arbitrating ownership of the first bus for said plurality of first bus masters and for arbitrating ownership of the second bus for said plurality of second bus masters, said arbitration means, coupled to said plurality of first bus masters and said plurality of second bus masters, and
DMA transfer means, coupled to said arbitration means, for performing a DMA transfer between the first component and the second component when the arbiter/DMA means has simultaneous ownership of both the first and second bus means.

25. A method for arbitrating bus ownership of a plurality of buses and for efficiently performing DMA transfers between a first component coupled to a first bus and a second component coupled to a second bus, said method comprising the steps of:
loading access priorities of a plurality of second bus masters coupled to the second bus into at least one programmable storage element; and
arbitrating ownership of the first bus for a plurality of first bus masters coupled to the first bus, wherein ownership of the first bus is provided to an arbiter/DMA element if said arbiter/DMA element is requesting ownership of the first bus and has an access priority greater than any other first bus master requesting ownership of the first bus;
arbitrating ownership of the second bus for said plurality of second bus masters, wherein ownership of the second bus is provided to said arbiter/DMA element when said arbiter/DMA element is requesting ownership of the second bus and has an access priority greater than any other access priority of said plurality of second bus loaded into the at least one programmable storage element; and
performing the DMA transfer between the first component coupled to the first bus and the second component coupled to the second bus when said arbiter/DMA element has simultaneous ownership of both the first and second buses.

26. A computer system comprising:
a first bus;
a plurality of first bus masters coupled to the first bus, said plurality of first bus masters including a first component;
a second bus;
a plurality of second bus masters coupled to said second bus, said plurality of second bus masters including a second component; and
an arbiter/DMA element coupled to said first bus and to said second bus, said arbiter/DMA element including:
a first arbitration element that arbitrates for ownership of the first bus for the plurality of first bus masters including said arbiter/DMA element,
a second arbitration element that arbitrates for ownership of the second bus for the plurality of second bus masters including said arbiter/DMA element to support a DMA transfer,
at least one programmable storage element coupled to the second arbitration element, said at least one programmable storage element provides programmable access priorities for each of said plurality of second bus masters to said second arbitration element, and
a DMA transfer state machine coupled to said first arbitration element and said second arbitration element, said DMA transfer state machine performs said DMA transfer between the first component and the second component when said arbiter/DMA element has simultaneous ownership of both the first and second buses.

27. A computer system comprising:

a first plurality of bus masters including a first component;

first bus means for coupling together at least said first plurality of bus masters;

a second plurality of bus masters including a second component;

second bus means for coupling together at least said second plurality of bus masters; and arbiter/DMA means for arbitrating ownership of said first and second bus means and performing a DMA transfer between said first bus means and said second bus means, said arbiter/DMA means including:

arbitration means for arbitrating ownership of the first bus means and for arbitrating ownership of the second bus means, said arbitration means, coupled to said first plurality of bus masters and said plurality of second bus masters, including a plurality of arbitration elements and at least one programmable storage means for providing programmable access priorities for each of said plurality of second bus masters to said second arbitration element, and DMA transfer means, coupled to said arbitration means, for performing a DMA transfer between the first component and the second component when the arbiter/DMA means has simultaneous ownership of both the first and second bus means.

* * * * *

UNITED STATES PATENT AND TRADEMARK OFFICE
CERTIFICATE OF CORRECTION

| | | |
|---|---|---|
| PATENT NO. | : | 5,619,726 |
| DATED | : | April 8, 1997 |
| INVENTOR(S) | : | Seconi et al. |

It is certified that error appears in the above-identified patent and that said Letters Patent is hereby corrected as shown below:

In column 2 at line 22 delete "too" and insert --to--

In column 12 at line 23 delete "C2-bus bus" and insert --C2-bus--

In column 17 at line 18 delete "tip" and insert --up--

In column 17 at line 24 delete "tip" and insert --up--

Signed and Sealed this

Twelfth Day of August, 1997

Attest:

BRUCE LEHMAN

Attesting Officer

Commissioner of Patents and Trademarks